COUPLING CIRCUIT ARRANGEMENT FOR THE SELECTIVE DISTRIBUTION OF POWER

Filed April 8, 1965

INVENTOR
D. H. KLOCKOW
BY Roy M. Porter
ATTORNEY 3,358,247

COUPLING CIRCUIT ARRANGEMENT FOR THE SELECTIVE DISTRIBUTION OF POWER

Dennis H. Klockow, Andover, Mass., assignor to Bell Telephone Laboratories, Incorporated, New York, N.Y., a corporation of New York Filed Apr. 8, 1965, Ser. No. 446,531
9 Claims. (Cl. 333—8)

ABSTRACT OF THE DISCLOSURE

A coupling arrangement for multiport circuits is disclosed. A single port is selectively coupled through a transformer to each of the remainder ports and there is applied a signal, derived from each loop corresponding to each of said ports, to every other of said loops to cancel signals coupled therebetween by the transformer winding.

This invention relates to coupling circuit arrangements and more particularly to a multiport circuit for the selective distribution of power.

Circuits such as hybrid circuits have been used extensively in telephone circuit repeater stage equipment for coupling two one-way circuits to a two-way circuit or for coupling two-way telephone circuits to a repeater stage. The usefulness of these circuits has arisen from the properties thereof which afford the ability to match impedances at four branches in addition to the ability to reciprocally transfer power between designated ports to the exclusion of other designated ports. Thus, for example, conventional hybrid circuits have been arranged to provide a means for combining a pair of signal paths into one while simultaneously preventing transmission from one port in the pair to the other. The same circuit also permits transmission from a single transmission path to each of the other two transmission paths thereby providing a matched reciprocal maximum power transmission circuit.

The conventional combining hybrid circuit arrangements described employ a transformer in the transmission path. The transformer has a secondary winding connected to the terminals of one port and a center tapped primary winding connected to the terminals of two other ports through an impedance network to form a bridge structure. One arm of the bridge may contain provision for a fourth signal port. This arrangement has a maximum capacity of combining the signals in two transmission paths into one. If, however, three transmission paths are to be combined into one, two of the signal paths must first be converted into a single path by passing through a first hybrid network to produce a resulting signal path which may thereafter be combined with the third path in a second hybrid network. Consequently, the signals in two of the three channels must pass through two transformers inserted in the transmission path and therefore suffer the frequency shaping and insertion loss of each.

The present invention provides a circuit arrangement for combining a plurality of signal paths into one with only one transformer placed in the transmission path through which all signals must pass. An auxiliary transformer is employed in obtaining the property of selective power distribution but it does not appear in the transmission path to alter the characteristics thereof. Each port of the circut is terminated in a characteristic impedance to provide impedance matching. Furthermore, the power is selectively distributed in the sense that signals introduced into any one or all of a group of ports is transmitted to a single port while no power is transmitted from a source in any one to any of the others within the group. Reciprocally, power introduced at the single port is equally distributed amongst each of the grouped ports.

Accordingly, it is an object of the present invention to provide a new and improved coupling circuit for the selective distribution of power.

It is another object of this invention to provide a coupling circuit arrangement wherein power is reciprocally transmitted between a selected port and a group of ports, while simultaneously providing zero coupling amongst the grouped ports.

It is still another object of this invention to provide a coupling circuit arrangement for combining a plurality of transmission paths into one, using only one transformer in the transmission path.

It is yet another object of this invention to provide a four-port coupling circuit arrangement wherein all ports are matched to the same characteristic impedance.

In accordance with the objects of the invention, a transformer, having a secondary winding terminating in a single transmission line and a primary winding divided into a plurality of segments, is connected so that the primary winding segments are individually connected to a corresponding number of ports or lines by means of a plurality of two conductor paths. In accordance with the broadest aspect of the invention the intercoupling amongst the plurality of ports resulting from the coupled primary winding segments is neutralized so that each of the plurality of ports is isolated from the remainder. The isolation is effected by introducing a signal derived from a given two-conductor loop associated with a given one of the plurality of ports into each two-conductor loop of the remaining ports with a magnitude and polarity adjusted to cancel the induced signal. More specifically, the canceling signal used for isolation in ports having adjacent two-conductor paths is derived from the voltage across a resistor common to the loops associated with each of the adjacent two-conductor paths. Furthermore, the canceling signal employed to effect isolation between ports with nonadjacent two-conductor paths is introduced into the respective loops by means of a transformer with windings coupled to each of the loops.

These and other objects and features of the present invention may be further understood by reference to the detailed description provided hereinbelow in connection with the accompanying drawing in which.

Figure 1:
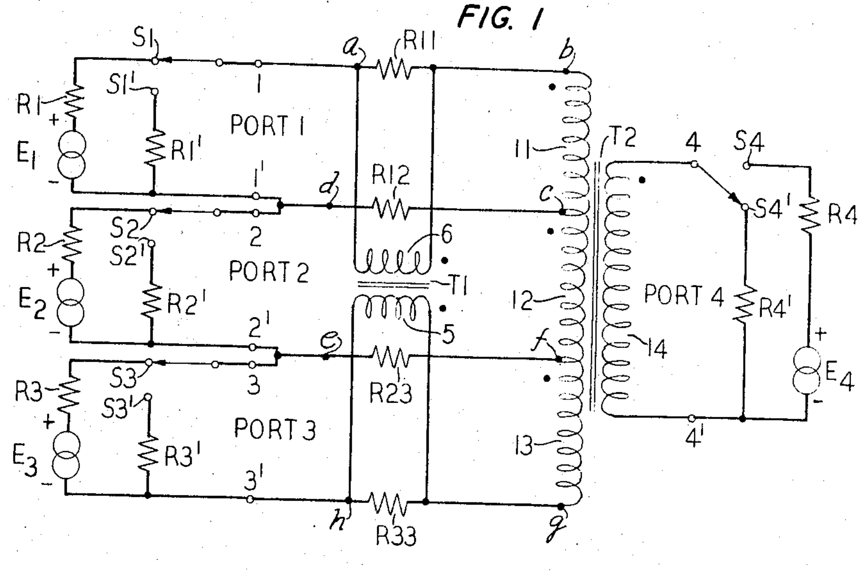
FIG. 1 is a schematic diagram of a specific embodiment of the invention.

In one specific embodiment of this invention shown in FIG. 1 a transformer T2 having a primary and a secondary winding is connected in a transmission path between a three-port termination designated as ports 1, 2 and 3 and a one-port termination designated as port 4. The primary winding is divided by two tap points *c* and *f* into three segments 11, 12 and 13 having equal turns ratio. Segments 11, 12 and 13 are connected respectively to ports 1, 2 and 3 through an impedance network including an auxiliary transformer T1 connected outside of the transmission path. The impedance network consists of four impedances and the windings of transformer T1 and includes specifically: winding 6 of transformer T1 in parallel with resistor R11 connected between transformer winding terminal *b* and terminal 1 of port 1; resistor R12 connected between tap point terminal *c* and terminals 1' and 2 connected in common; resistor R23 connected between tap point terminal *f* and terminals 2' and 3 connected in common; and winding 5 of transformer T1 in parallel with resistor R33 connected between winding terminal *g* and port terminal 3'. By properly selecting the values of the impedance elements and the turns ratios of the transformers shown, the circuit can be arranged to simultaneously match the characteristic impedance of each port; either provide a means for combining three signal paths into one while isolating each of the three from the others, or provide a means for supplying three paths from one source path which in effect distributes its energy equally amongst the three; and provide a maximum power transfer circuit between coupled ports. The switching arrangements shown in FIG. 1 are illustrative of the alternate modes of transmission possible. Thus, with port terminals 1, 2, 3 and 4 connected respectively to switch terminals S1, S2, S3 and S4', sources E1, E2 and E3 with their respective output impedances R1, R2 and R3 are connected respectively to ports 1, 2 and 3 to feed in common the load represented by R4' connected to port 4. However, if port terminals 1, 2, 3 and 4 are connected respectively to switch terminals S1', S2', S3' and S4 then source E4 having output impedance R4 feeds loads R1', R2' and R3' connected respectively to ports 1, 2 and 3.

In the illustrative embodiment shown in FIG. 1, with ports 1, 2 and 3 connected to their respective sources and with port 4 terminated in the load impedance, isolation of port 1 from port 2 is accomplished with the aid of resistor R12 positioned as shown common to the circuit loops associated with ports 1 and 2. Isolation between ports 2 and 3 is accomplished with the aid of resistor R23 positioned in common to the circuit loops associated with ports 2 and 3, and isolation between ports 1 and 3 is obtained by virtue of he voltage coupled by transfer T1 from the loop associated with port 1 to the loop associated with port 3. More specifically, if port 1 is connected to voltage source E1 and all other terminals are terminated in load impedances (R2', R3' and R4') the voltage inductively coupled from winding segment 11 to winding segment 12 is cancelled by means of the voltage developed across resistor R12 (due to the flow of current in the loop associated with port 1) and the voltage induced in winding segment 13 is cancelled by means of the voltage across resistor R11 which is applied across resistor R33 by means of transformer T1. Because of the circuit symmetry, an identical analysis can be made for a source connected to port 3 when all other ports are terminated in their respective impedances. When, however, port 2 is connected to source E2 and the other ports are terminated in load impedances, the voltages inductively coupled from segment 12 to segments 11 and 13 are cancelled by the voltages developed across resistors R12 and R23 respectively which voltages are due to the loop current associated with port 2.

By the principle of superposition it is readily seen that when ports 1, 2 and 3 are fed from any or all of the sources E1, E2 and E3, no source energy is coupled from one port to any other in the group of three ports, but that each source delivers one third of its available energy via transformer T2 to the load represented by resistor R4'. It should also be obvious that when port 4 is connected to source E4 and ports 1, 2 and 3 are terminated in their respective load impedances R1', R2' and R3' that energy from source E4 is coupled reciprocally via transformer T2 to each of the load terminated ports.

The specific details of the circuit operation can be best explained in terms of specific component values. For this purpose it is to be assumed that the component values designated below are applicable to the circuit shown in FIG. 1.

$R1=R1'=R2=R2'=R3=R3'=R4=R4'=R$ ohms
$R11=R33=\frac{2}{3}R$ ohms
$R12=R23=\frac{1}{3}R$ ohms Turns ratio between windings 5 and 6 of transformer T1 is 1:1

Turns ratio amongst winding segments 11, 12 and 13 of transformer T2 is 1:1

Turns ratio between winding segments 11 and winding 14 of transformers T2 is $1:\sqrt{3}$ Assume further that terminal 1 is connected through terminal S1 to source E1 having a magnitude of E volts and that each of the other ports is terminated in R ohms by connecting terminals 2, 3 and 4 to terminals S2', S3' and S4' respectively. Because of the turns ratio selected for the windings of transformer T2 the impedance seen looking into each of the respective windings 11, 12 and 13 is $\frac{1}{3}$R. By applying Kirchoff's law to the mesh or loop which includes source E with its associated output impedance of R ohms represented by resistor R1 connected to terminals 1–1', resistor R11 in parallel with the resistance seen looking into winding 6 of transformer T1, winding 11 of transformer T2 and resistor R12, it is seen that the voltage of point *b* with respect to point *c* is $E/6$ and that the voltage of point *c* with respect to point *d* is similarly $E/6$. It may be noted that the impedance seen looking into winding 6 of transformer T1 is that of R33 or $\frac{2}{3}$R and that this resistance is in parallel with R11 also having a value of $\frac{2}{3}$R ohms to give an effective parallel resistance of $\frac{1}{3}$R ohms.

In accordance with standard terminology, a voltage such as $V_{bc}$ is used to designate the voltage of point *b* with respect to point *c* and the dots associated with the respective winding segments of each transformer indicate that the coils are wound so that when the voltage applied to one winding or winding segment is positive at the dotted terminal, then all other windings are positive at their respective dotted terminals. Furthermore, it is to be noted that by definition a voltage $V_{bc}$ is equal to the negative of a voltage $V_{cb}$. Thus, if a voltage impressed across segment 11 is such that terminal *b* is positive with respect to terminal *c* then $V_{cf}$, $V_{fg}$, and $V_{44'}$ are all positive quantities equal respectively to the negative of voltages $V_{fc}$, $V_{gf}$, and $V_{4'4}$. With this in mind the voltage across points *d* and *f* may now be examined.

Because winding 11 has the same number of turns as winding 12, $V_{cf}$ is equal to $V_{bc}$ which is equal to $E/6$. In traversing the second mesh included between terminals 2–2', it is seen that the voltage $V_{df}$ is equal to the sum of $V_{dc}$ and $V_{cf}$. From the analysis of the first mesh, $V_{dc}$ is the negative of $V_{cd}$ or equal to minus $E/6$, and $V_{cf}$ is equal to plus $E/6$. Therefore, voltage $V_{df}$ is equal to zero and no power from source E appears across resistor R2' associated with port 2.

A similar analysis will reveal that voltage $V_{hf}$ is also zero and that no power from source E is consumed in resistor R3' associated with port 3. By the previous analysis the effective resistance between points *a* and *b* is the parallel combination of R11 and R33, or $R/3$, and as a consequence of source E, $V_{ab}$ was equal to $E/6$. Due to the action of transformer T1 having a pair of windings with unity turns ratio and a dot polarity as shown, the voltage $V_{hg}$ is also equal to $E/6$. Furthermore, since winding 13 of transformer T2 has the same number of turns as winding 11 to which it is coupled, and because of the dot polarity shown in transformer T2, $V_{fg}$ is equal to $E/6$. In summing the voltage around the loop, $V_{hf}$ is equal to $V_{hg}$ plus $V_{gf}$ or plus $E/6$ added to minus $E/6$ to give a zero value.

As a consequence of source E being connected to terminals 1–1' the voltage $V_{bc}$ was found to be $E/6$ and therefore the voltage across $V_{44'}$ is $$\sqrt{\frac{3}{6}}E$$

Therefore, power is delivered from port 1 to port 4 while no power is transmitted from port 1 to either of ports 2 and 3. Because of the symmetry of the circuit, an identical analysis can be made for a voltage source of E volts connected to port 3 between terminals 3–3'. This source of E volts at terminals 3–3' will also deliver $\frac{1}{6}$ of its total output power to terminals 4–4' with ports 1 and 2 getting no power at all.

If generator E2 having a magnitude of E volts and an output impedance (R2) of R ohms is connected to port 2 between terminals 2–2′, and the other ports are terminated in their respective loads of R ohms, an examination of the loop or mesh between terminals 2–2′ including resistor R12, winding 12 of transformer T2 and resistor R23) reveals that $V_{dc}$ is equal to $V_{cf}$ is equal to $V_{fe}$ is equal to $E/6$ since the resistance seen looking into winding 12 is ⅓R ohms and resistors R12 and R23 have each been selected to have ⅓R ohms. Again, because of the coupling between winding segments 12, 11, and 13, voltages $V_{fg}$ and $V_{bc}$ are both equal to $E/6$ The voltage $V_{bd}$, being the sum of $V_{bc}$ and $V_{cd}$ (or the difference between $V_{bc}$ and $V_{dc}$), is equal to zero and consequently no power is delivered to resistor R1′ associated with port 1. Similarly the voltage $V_{eg}$ is equal to the sum of $V_{ef}$ and $V_{fg}$ or a negative $E/6$ plus a positive $E/6$ giving a zero value. Therefore, no power is delivered to resistor R3′ associated with port 3.

In a reciprocal fashion, if source E4 having a magnitude of E volts and an output impedance (R4) of R ohms is connected to port 4 between terminals 4–4′ and ports 1, 2 and 3 are each terminated in R ohm loads, it may be seen that ½ the power output from the source is divided equally amongst ports 1, 2 and 3 so that each receives ⅙. This result flows from the fact that the impedance seen looking into winding 14 of transformer T2 is R ohms. Additionally, it is obvious that voltage $V_{44'}$ across the secondary of transformer T2 (winding 14) is transformed into three equal voltages consisting of $V_{bc}$, $V_{cf}$, and $V_{fg}$ which appear in identical mesh equations. In this mode of operation no power is dissipated in resistors R11, R12, R23 or R33 since the voltage across each is zero. By inspection, it is obvious that the voltage across resistors R12 and R23 is zero due to the symmetry of the circuit. The voltage across resistors R11 and R33 is seen to be zero since the current flow in each winding of transformer T1 is in opposite directions with a zero net ampere turn and zero core flux change. A solution of the mesh equations for the impedance values and winding ratios assumed will confirm that the power delivered to each of ports 1, 2, and 3 is indeed ⅙ of the power put out by the source connected to port 4. Further analysis of the circuit will reveal that the impedance seen looking into each of the ports is R ohms and therefore each of the ports is matched to the characteristic impedance of the lines to which they are connected.

Figure 2:
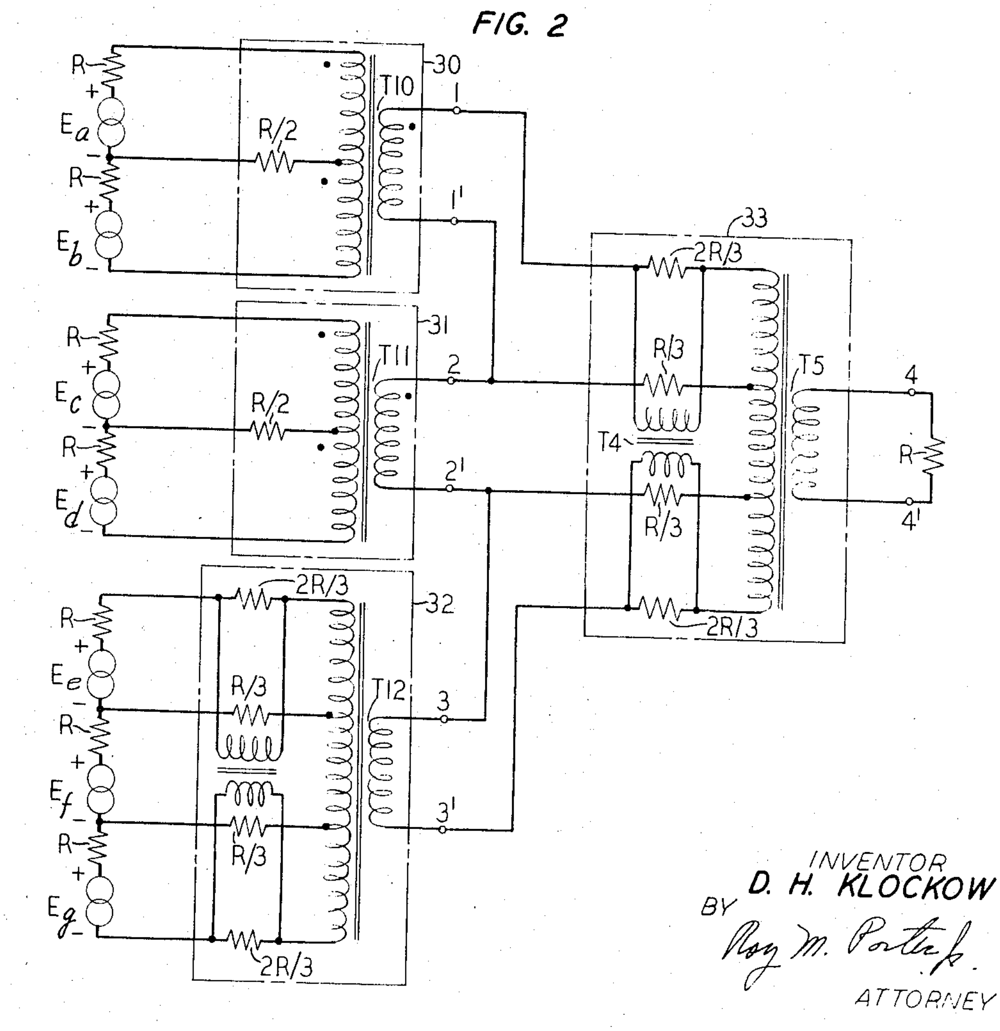
FIG. 2 is a schematic diagram of an application of the invention in a selective power distribution system.

Illustrated in FIG. 2 is an application of the circuit shown in FIG. 1 to combine seven signal paths into one using only two transformers in each transmission path. Combining circuits 32 and 33 are substantial duplicates of the circuit shown in FIG. 1 and the combining circuits 30 and 31 are conventional biconjugate hybrid transformer circuit arrangements. Sources E*a* and E*b* are combined by means of combining circuit 30 into a single signal transmission path to produce a signal input at terminals 1–1′ or port 1 of the combining circuit 33. Sources E*c* and E*d* are similarly combined by means of standard combining circuit 31 into a single signal transmission path connected to terminals 2–2′ of the combining circuit 33. Sources E*e*, E*f* and E*g* are combined by means of combining circuit 32 into a single path which is connected to the third port of terminals 3–3′ of combining circuit 33. The signals thus combined and appearing respectively at terminals 1–1′, 2–2′ and 3–3′ are combined by means of combining circuit 33 into a single transmission path connected by means of terminals 4–4′ to drive a load impedance of R ohms.

Each of the respective circuits 30 and 31 have, in accordance with standard hybrid techniques, a transformer with a center tapped primary winding and a secondary winding the turns ratio between which is $2:\sqrt{2}$. The combining circuits 32 and 33 present, as stated above, an impedance of R ohms looking into any terminal and therefore the secondary windings of transformers T10, T11 and T12 each drive loads of R ohms. At the same time it may be noted that the impedance seen looking towards the sources into the secondary windings of transformers T10, T11, and T12 is R ohms in each case and therefore terminals 1–1′, 2–2′ and 3–3′ of combining circuit 33 are each driven from R ohm sources. Again it may be noted that each of the seven ports of the circuit shown in FIG. 2 is matched to the characteristic impedance of R ohms.

It is to be understood that the above-described arrangements are illustrative of the application of the principles of the invention. Numerous other arrangements may be devised by those skilled in the art without departing from the spirit and scope of the invention.

What is claimed is:

1. A multiport circuit for coupling three or more transmission paths to a single path comprising a transformer having a primary and a secondary winding, said secondary winding being coupled through one of said ports to said single path, said primary winding being divided by a plurality of tap points into three or more segments, means for connecting said three or more segments through a corresponding number of ports to the remainder of said transmission paths including a number of circuit loops corresponding to said number of segments individually coupling each of said segments through a corresponding port to a corresponding transmission path and means for neutralizing the coupling between and isolating inter se said number of ports including means for applying a signal derived from each of said loops to every other one of said loops to cancel signals coupled therebetween by said primary winding.

2. A multiport circuit for coupling a plurality of transmission paths to a single path comprising a transformer having a primary and secondary winding, said secondary winding being coupled through one of said ports to a single path, said primary winding being divided by a plurality of tap points into a number of segments, means for connecting said number of segments through a corresponding number of ports to the remainder of said transmission paths including a number of circuit loops corresponding to said number of segments individually coupling each of said segments through a corresponding port to a corresponding transmission path, means for applying a signal derived from each one of said loops to every other of said loops which has a common portion with said one loop including an impedance common to both loops and means including an inductive coupling for applying a signal derived from each one of said loops to every other of said loops without common portion with said one loop.

3. In a coupling circuit having each of four or more ports terminated in a characteristic impedance, means for providing power transmission between one of said ports and the remainder of said ports while simultaneously prohibiting transmission inter se in said remainder ports comprising a transformer having a secondary winding connected to said one port and having a primary winding divided into three or more segments by a plurality of tap points, means for connecting each of said segments to a corresponding remainder port including a plurality of impedances connected so that each impedance couples one of said tap points to a terminal on one of said remainder ports, and means for maintaining the same voltage across each of two of said each impedances, said two impedances including a first and a second impedance, said first impedance coupling a terminal of one remainder port to a corresponding tap point and said second impedance coupling a terminal of a different one of said remainder ports to a corresponding tap point, said voltage maintaining means and said transformer winding ratios and said impedances being selected to provide equal effective impedance values connected to and between each of said tap points.

4. A coupling circuit having each of a plurality of ports terminated in a characteristic impedance, means for providing power transmission between one of said ports and the remainder of said ports while simultaneously prohibiting transmission inter se in said remainder ports comprising a transformer having a secondary winding connected to said one port and having a primary winding divided into segments by a plurality of tap points, means for connecting each of said segments to a corresponding remainder port including a plurality of impedances connected so that each impedance couples one of said tap points to a terminal on one of said remainder ports and so that two of said impedances each connects one of said tap points and a terminal of two different remainder ports and the other of said impedances connects terminals of two of said remainder ports connected in common and other of said tap points, and means for maintaining the same voltage across the said two of said impedances, said voltage maintaining means and said transformer winding ratio and said impedances being selected to provide equal effective impedance values connected to and between each of said tap points.

5. In a coupling circuit having a plurality of two-terminal ports terminated in impedances of substantially equal value, means for providing exclusive and reciprocal power transmission between one of said ports and the remainder of said ports while said last-named ports are isolated inter se comprising a first transformer having a secondary winding connected to said one port and having a primary winding with terminals at each end, said primary winding being divided by tap point terminals into segments, means for directly joining one terminal of each of said remainder ports to one terminal of another of said remainder ports, a plurality of impedances each connected from one of said joined terminals to one of said tap point terminals, first and second further impedances connected respectively from the remaining terminals of said remaining ports to said end terminals of said primary winding, a second transformer having a first winding connected across said first further impedance and having a second winding connected across said second further impedance, said first and second transformer winding ratios and said impedances being selected to provide equal effective impedance values conncted to and between each terminal of said first transformer.

6. A coupling circuit in accordance with claim 5 having four two-terminal ports wherein said first transformer primary winding is divided into three segments by a pair of tap point terminals.

7. In a coupling circuit having a plurality of two-terminal ports terminated in impedances of substantially equal value, means for providing exclusive and reciprocal maximum power transmission between one of said ports and the remainder of said ports while said last-named ports are isolated inter se comprising a first transformer having a secondary winding connected to said one port and having a primary winding with terminals at each end, said primary winding being divided by tap point terminals into segments having equal turns ratio, means for connecting said remainder ports to said primary winding including a first impedance connected in common from a first terminal of a first port of said remainder and a first terminal of a second port of said remainder to one of said tap point terminals, a second impedance connected in common from a second terminal of said first port and a first terminal of a third port of said remainder to another of said tap point terminals, third and fourth impedances connected respectively from the second terminal on said second port and the second terminal of said third port to said end terminals of said primary winding, a second transformer having a first winding connected across said third impedance and having a second winding connected across said fourth impedance, said first and second transformer winding ratios and said impedances being selected to provide equal effective impedance values connected to and between each terminal of said first transformer.

8. In a coupling circuit having each of four two-terminal ports terminated in a characteristic impedance Z, means for providing exclusive and reciprocal maximum power transmission between one of said ports and the remainder of said ports while said last-named ports are isolated inter se comprising a first transformer having a primary and a secondary winding, said secondary winding being connected to one of said ports, said primary winding having a pair of tap point terminals for dividing said primary winding into three equal segments each of which having a transformation ratio with said secondary winding of $1\sqrt{3}$, each of said tap point terminals being respectively connected through an impedance of $Z/3$ to a different terminal of a second of said ports, a third and a fourth port each having one terminal thereof connected to a different one of said second port terminals and having a second terminal thereof connected through an impedance $2Z/3$ to different ends of said primary winding, and a second unitary-ratio transformer having a first winding connected in parallel with one of said $2Z/3$ impedances and a second winding connected in parallel with a second of said $2Z/3$ impedances.

9. A coupling circuit in accordance with claim 7 wherein each of said impedances are resistors.

References Cited

UNITED STATES PATENTS

| | | | |
|---|---|---|---|
| 3,181,087 | 4/1965 | Almering | 333—11 |
| 3,296,557 | 1/1967 | Petts et al. | 333—8 |

HERMAN KARL SAALBACH, *Primary Examiner.*

ELI LIEBERMAN, *Examiner.*

P. L. GENSLER, *Assistant Examiner.*